March 27, 1962 E. A. WOODIN 3,027,427

ELECTRONIC SWITCHING NETWORK

Filed June 6, 1958

INVENTOR
E. A. WOODIN
BY Alan C. Rose
ATTORNEY 3,027,427
Patented Mar. 27, 1962

3,027,427
ELECTRONIC SWITCHING NETWORK

Elmer A. Woodin, West Caldwell, N.J., assignor to Bell Telephone Laboratories, Incorporated, New York, N.Y., a corporation of New York Filed June 6, 1958, Ser. No. 740,263
10 Claims. (Cl. 179—18)

This invention relates to electronic switching systems for communication networks and more particularly to central office switching networks for such systems.

In telephone central office communication systems an arrangement for permitting the interconnection of particular central office subscribers is required. In one arrangement for accomplishing this purpose, a switching circuit interconnects each line in a first group of lines with each line in a second group of lines. The switching network includes a series of stages between the two groups of lines, with each stage including a number of crosspoints or breakdown devices. The breakdown devices are interconnected to provide many paths between each line in the first group and each line in the second group of lines. In electronic switching systems, the crosspoint elements are employed for establishing the path between lines as they are switched from their high impedance to their low impedance states. Following the establishment of connections through the network, each series of energized crosspoints also constitutes a talking path through the network. In addition, cross-talk between different talking paths is prevented by the blocking action of crosspoints in their high impedance states.

One such system which employs gaseous discharge tubes for the principal network elements, or crosspoints, is disclosed in Patent 2,684,405 of E. Bruce et al., granted July 20, 1954. Networks have been disclosed employing various types of semiconductor devices or circuits for the crosspoint elements. Application Serial No. 717,216 of L. W. Hussey, filed February 24, 1958, and assigned to the assignee of this invention, discloses an electronic switching network using transistor circuits as crosspoints.

One device which satisfies certain of the requirements imposed upon switching network crosspoints is the PNPN semiconductor diode, described in "P-N-P-N Transistor Switches" by J. L. Moll et al., page 1174 of Proceedings of the I.R.E., vol. 44, No. 9. The PNPN diode has a normal high impedance-low current state separated from a low impedance-high current state by a negative resistance region. The device may be switched to the low impedance state by applying a voltage in excess of a certain breakdown potential. Thus it would appear quite suitable for inclusion as a crosspoint switch in an electronic switching network. However, one drawback to such a use has been found in the tendency of the device to break down in response to transient or sharply rising voltages at a level substantially below the normal breakdown potential. This characteristic permits the establishment of unwanted connections when PNPN diodes are employed in crosspoint switching networks.

It is, therefore, an object of this invention to improve switching networks employing PNPN diodes.

A further object of this invention is to overcome the sensitivity of PNPN diodes to transient voltages in a switching circuit.

Another object of this invention is to prevent the establishment of unwanted paths in a switching network employing PNPN diodes.

A more specific object of this invention is to prevent the establishment of connections to transmission paths already in use in a switching network utilizing PNPN diodes as crosspoints.

In accordance with these and other objects, this invention provides a switching network employing PNPN diode crosspoints in an arrangement which limits the amplitude of the voltage change which may be applied to any particular crosspoint when selecting, or marking, a desired transmission path. This is accomplished by providing a plurality of high impedance paths from the switching stages to bias voltage sources to establish the voltage across each idle crosspoint at or near the breakdown potential while limiting the current through it below the minimum value required to switch the crosspoint to its low impedance, or "On," state. When a crosspoint is to be switched "On," a voltage only slightly larger than that which has been applied from the bias source is connected to the crosspoint through a low impedance, thereby effectively bypassing the major portion of the impedance in the crosspoint bias source loop. As a result, the resistive load line for the immediate circuit of the PNPN diode is shifted, thus permitting the diode to change state with a very small change in node potential. This small shift of potential is below the level which causes unwanted crosspoint switching. Therefore, while the application of such a marking voltage produces breakdown in crosspoints of idle paths to which it is applied, unwanted connections into a busy path are prevented. A similar arrangement in accordance with this invention may be employed in a PNPN diode switch to prevent the breakdown of the switch in response to voltages other than those which are intended to produce switching.

It is a feature of this invention that a PNPN diode be connected through a large impedance to a source of voltage substantially equal to the breakdown voltage of the diode and that a signal voltage only slightly above the breakdown potential be applied through a low impedance path to cause the diode to change state.

Another feature of this invention is the provision of current limiting elements and a bias source in one series loop with a bistable device which is sensitive to sharp voltage changes and a low impedance signal voltage source for applying signaling voltages only slightly larger than the bias voltage to cause the bistable device to assume its low impedance state.

In accordance with another feature of this invention, a switching circuit may include a bistable device which is sensitive to sharp voltage changes, a source of bias voltage approximately equal to the breakdown voltage and connected to the device through a large impedance, and a source of signal voltage only slightly larger than the breakdown voltage of the device which may be selectively applied thereto through a low impedance path to bypass the aforementioned high impedance and switch the state of the device.

A further feature of this invention is the provision, in a switching network for interconnecting selected terminals, of a number of transient-sensitive bistable devices connected between the terminals and having circuit nodes between devices, a normally reverse-biased rectifier in series between each pair of adjacent circuit nodes, bias voltage sources, and high impedance elements connecting the biasing sources to the nodes to limit the current from the associated biasing source below the value required to switch an adjacent bistable device. In addition, a signaling circuit is provided for applying a source of voltage slightly larger than the biasing voltage in low impedance connection to particular terminals of the network to bypass certain of the high impedance elements, overcome the normal bias of the associated rectifiers, and establish a transmission path between selected terminals.

An additional feature of this invention is the provision, in a switching network employing bistable devices sensitive to sharp voltage changes, of a bias arrangement connected to nodes between pairs of bistable devices, which bias arrangement includes current limiting elements to prevent the breakdown of any device due to its associated bias arrangement, and a signaling circuit connected to the network to break down certain of the bistable devices and set up a transmission path through the network without breaking into previously established network paths.

A complete understanding of this invention and of these and various other features thereof may be gained from consideration of the following detailed description and the accompanying drawing, in which.

Figures 1, 2, 3:
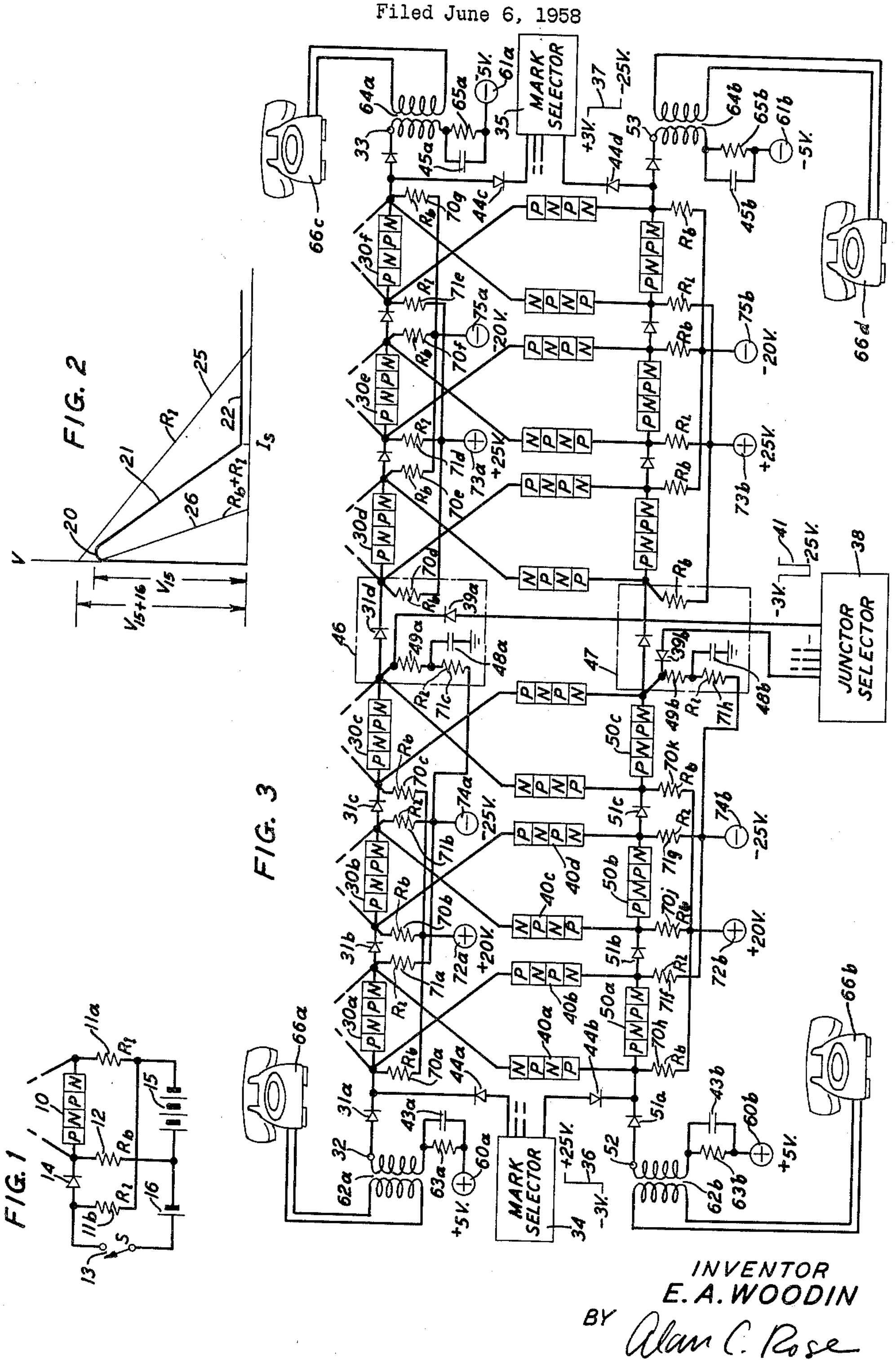
FIG. 1 depicts a switching circuit in accordance with one specific embodiment of the invention, which switching circuit is representative of a single stage of a switching network.
FIG. 2 is a chart of the voltage-current characteristic curve of a PNPN diode.
FIG. 3 depicts a switching network in accordance with another specific embodiment of this invention.

In the switching circuit depicted in FIG. 1, a PNPN diode 10 is connected in one series loop through load resistor 11$a$ and bias resistor 12 to the negative and positive terminals, respectively, of a source 15 of bias voltage. One of these terminals, for example the negative terminal, may be a reference potential if desired. A rectifier 14 is connected to one side of the diode 10 to form a second current path. The other side of the rectifier 14 is connected through a resistor 11$b$ to the negative side of source 15 to maintain the rectifier normally reverse-biased. A second voltage source 16 and a series switch 13 are connected between the positive side of source 15 and the junction of rectifier 14 and the resistor 11$b$.

FIG. 2 shows a simplified voltage-current characteristic curve of the PNPN diode shown in FIGS. 1 and 3. The characteristic curve as depicted has a maximum potential point 20, corresponding to the breakdown potential, a region 21 of negative rsistance and a region 22 of low positive resistance.

In operation, the PNPN diode is normally in the high impedance state to the left of the voltage peak 20. It may be switched out of the high impedance state by the application of a voltage greater than the breakdown voltage from a source providing a stable operating point to the right of the peak 20 of FIG. 2. In the specific example shown in FIG. 2, the switching voltage is but slightly greater than the breakdown potential and is applied from a circuit which permits a current exceeding the sustaining current $I_s$ of the device. Also shown in the graph of FIG. 2 are a pair of load lines 25 and 26 corresponding to different values of resistance in circuit with the PNPN breakdown diode. Load line 26 corresponds to circuit conditions under which the diode could not switch on, even with an applied voltage equal to the breakdown voltage, while load line 25 corresponds to a lower resistance circuit in which the diode is switched by a voltage only slightly greater than its breakdown voltage.

In FIG. 1 the bias source 15 is selected to have a voltage substantially equal to the breakdown voltage of the PNPN diode 10. However, the resistance 12 is of sufficient magnitude that the diode 10 is prevented from switching to its low impedance state under the application of the bias voltage 15. This is indicated by reference to FIG. 2 with the voltage $V_{15}$ at the level of the peak 20 and the load line 26 corresponding to the series combination $R_b+R_l$. However, the diode 10 may be switched to its low impedance state by the application of a voltage from a low impedance source and having a value only slightly higher than the breakdown potential. This situation corresponds to the combination in FIG. 2 of the voltage $V_{15+16}$ and the load line 25 for a resistance $R_l$.

In the operation of the circuit of FIG. 1 in accordance with one aspect of this invention, the bias voltage 15 is continuously applied across the diode 10 and also maintains rectifier 14 normally reverse-biased. As already shown this voltage is insufficient in the loop containing resistors 11$a$ and 12 to cause the diode 10 to change state. However, when switching is desired, a small additional voltage from source 16 is applied by the closure of switch 13 through rectifier 14 to one side of the diode 10. This overcomes the normal reverse bias of rectifier 14 and accomplishes two results: (1) the potential at the left side of diode 10 is shifted slightly positive and (2) the large bias resistance 12 is shunted out of the circuit. These changes produce a shift from the load line 26 to the load line 25 of FIG. 2 and the breakdown diode 10 is switched to its low impedance state. Thus is accomplished one of the major objects of this invention, namely, the switching on of a particular PNPN diode without a large change of potential at its input node.

In FIG. 3, there is depicted a representative section of a switching network in accordance with certain aspects of the invention. This network includes a plurality of PNPN diodes in successive circuits similar to that depicted in FIG. 1. The portion of the network shown includes two possible paths through the network with interconnecting PNPN diodes between corresponding stages thereof. The upper path comprises a plurality of PNPN diodes 30 arranged in series between the terminals 32 and 33. In series with each of the PNPN diodes 30 is an associated rectifier 31. Similarly, the lower path comprises a plurality of PNPN diodes 50 with associated rectifiers 51 between the terminals 52 and 53. Arranged between the two paths are PNPN diodes 40 to provide cross connections when desired. Mark selectors 34 and 35, producing pulses 36 and 37 respectively, are connected to opposite ends of the network. At an intermediate point in the network there is shown a junctor selector 38 connected to the network through rectifiers 39 for controlling the establishment of a path through the network. Connected to the terminals 32 and 52 through associated transformers 62 and resistors 63 are positive holding voltage sources 60, while negative holding voltage sources 61 are similarly connected to the opposite network terminals 33 and 53 through transformers 64 and resistors 65. The alternating current bypass capacitors 43 and 45 are connected in parallel with the resistors 63 and 65 to reduce losses in the signal transmission paths. Appropriate connections from the transformers 62 and 64 are made to subscriber station equipment as represented by telephone subsets 66. Each of the PNPN diodes 30, 40 or 50, is forward-biased short of breakdown by a potential difference supplied by sources 72 and 74 or 73 and 75. These bias voltages are applied through either bias resistor 70 or load resistor 71, which resistors correspond to resistors 12 and 11$a$ of FIG. 1. Since only a representative section of a complete switching network is shown in FIG. 3, it is to be understood that multiple connections proceed from each PNPN diode terminal to other portions of the network, as indicated by the dashed lines connected to the upper path in the figure.

In the operation of the specific embodiment of this invention depicted in FIG. 3 the establishment of a connection between subscriber sets 66$a$ and 66$c$ along the upper network path will be described. Initially, it is assumed that all of the PNPN diodes 30, 40 and 50 are in their high impedance-low current state. The bias voltage sources 72, 73, 74 and 75 provide a voltage across each PNPN diode which is approximately equal to its breakdown voltage. However, as already explained in connection with FIGS. 1 and 2, the resistors 70 and 71 prevent the associated PNPN diodes from being switched at this potential and impedance level.

The junctors 46 and 47 shown in dash-dot boxes are located at intermediate points in the switching network. Under the control of the junctor selector 38, the junctors 46 and 47 complete the path through the switching network. In addition to resistors 70 and 71, the junctors each include a diode 39, a capacitor 48, and another resistor 49 which has a relatively small value as compared to each resistor 71. Representative values of resistance for each pair of resistors could be 50,000 and several hundred thousand ohms, for example. The mode of operation of these circuit components which form part of the junctor circuit will be described below.

The switching action of the network of FIG. 3 is controlled by the mark selectors 34 and 35 and the junctor selector 38. The diodes 44 and 39 are connected respectively in the control leads for the mark and junctor selectors. A slightly negative voltage is normally applied to these leads with respect to the nominal zero voltage on a busy path. The diodes 39 and 44 coupled to a busy path are therefore back-biased to avoid shunt loss paths from the busy signal transmission path. In the case of an idle transmission path the bias sources 74 forward bias the junctor diodes 39 and clamp the control points of the switching network to −3 volts.

Selection of a network path is initiated by the application of positive pulse 36 and negative pulse 37 to the opposite ends of the network from mark selectors 34 and 35, respectively. This voltage has a slightly greater magnitude than the voltage normally applied through the bias resistors 70 and, in addition, is presented from a low impedance source. Thus, the pulse 36 increases the potential on the left-hand end of the PNPN diode 30*a* by a small amount and in effect bypasses the bias resistor 70*a*. This provides a circuit from mark selector 34 through PNPN diode 30*a* and load resistor 71*a* to the connecting voltage source 74*a*, which circuit now possesses the load line characteristic 25 of FIG. 2. Since conditions are now favorable for the breakdown of diode 30*a*, it switches to its low impedance-high current state, and the resulting reduction in the voltage drop across diode 30*a* allows the pulse from mark selector 34 to propagate to the next succeeding stage. Rectifier 31*b* then becomes forward-biased, the potential at the anode of PNPN diode 30*b* is increased slightly, and the bias resistor 70*b* is effectively bypassed. Diode 30*b* now switches in the same manner as did diode 30*a* and passes the mark on to the stage containing diode 30*c*. This diode, however, is prevented from switching by the potential applied to its cathode from the junctor. The negative mark pulse 37 from mark selector 35 progresses through PNPN diodes 30*f* and 30*e* in a similar fashion. This mark is stopped at diode 30*d* because, although resistor 70*e* becomes effectively bypassed, bias resistor 70*d* has a large resistance which prevents diode 30*d* from switching.

It may be noted that certain of the cross-connected PNPN diodes between the two depicted network paths as well as other diodes providing cross connections to unshown portions of the network will have the voltage conditions necessary for breakdown applied thereto as have the diodes 30*a*, 30*b*, 30*e* and 30*f*. Such cross-connected diodes as, for example, 40*b* will also break down in a pattern which is known in the art as "fan-out" to provide possible alternate paths between a pair of network terminals. However, when the mark voltage from mark selectors 34 or 35 is terminated, all alternate partial paths which are not completed through a junctor are extinguished. This action results from the fact that each of the hold voltages $V_{60}$ and $V_{61}$ in combination with the associated bias voltages $V_{73}$ or $V_{74}$ in series with a resistor $R_1$, does not supply enough current to sustain the PNPN diodes. In this regard it may be noted that resistors 63 and 65 are relatively small with respect to the load resistors 71 and therefore may be neglected.

Following the selection operations mentioned above, the signals from the mark selectors 34 and 35 have propagated through the switching network to PNPN diodes 30*c* and 30*d*, respectively. At this point, as mentioned above, the right-hand side of the PNPN diode 30*c* is clamped at −3 volts by virtue of the normal bias applied from junctor selector 38 to diode 39*a*. The junctor selector 38 now applies a negative pulse as shown at 41 to the diode 39*a*. The capacitor 48*a* charges toward the −25 volt level of pulse 41 and biasing source 74*a*. Under these conditions, diode 30*c* switches to its low impedance state and the mark propagates through rectifier 31*d* and switches PNPN diode 30*d* to the low resistance state. This action completes the transmission path through the switching network.

In the event that the mark from selector 35 is blocked from reaching PNPN diode 30*d*, as by a busy path, a connection cannot be set up through the particular junctor 46. The junctor selector 38 then applies a selection signal to the next junctor in sequence to complete the path. In order to avoid excessive "fan-out" current from the energization of many PNPN diodes, it is desired that PNPN diode 30*c* be extinguished. However, the pulse 36 from mark selector 34 must be retained to maintain the energization of PNPN diodes 30*a* and 30*b*. Accordingly the capacitor 48*a* and resistors 49*a* and 71*c* are so arranged that the diode 30*c* is switched off automatically in the event the diode 30*d* does not switch to its low-impedance state within a predetermined time. In this interval the voltage across capacitor 48*a* increases until eventually, as noted above, the resulting voltage and current conditions are insufficient to maintain conduction through PNPN diode 30*c*, and it reverts to its high impedance state.

A further aspect of this invention will now be described by considering the establishment of a network path between subscribed subsets 66*b* and 66*d* while assuming that the connection between sets 66*a* and 66*c* through the diodes 30 is maintained. Mark selector pulses 36 and 37 are applied to the respective ends of the lower path in FIG. 3 and the breakdown of the PNPN diodes 50 proceeds as described above with respect to the diodes 30. It is imperative, however, that none of the cross-connecting diodes 40 switch on to provide a low impedance connection between the lower and upper paths.

The busy path through the diodes 30, because of the low impedance of these diodes, is maintained at potentials between the associated holding voltages 60*a* and 61*a*, +5 volts and −5 volts, respectively. Thus, each one of the interconnecting diodes 40 has a voltage across it considerably less than its breakdown voltage. However, without the limitation upon the amplitude of the voltage pulse applied to any PNPN diode node by the mark selectors 34 and 35 in accordance with this invention, unwanted switching of some of the interconnecting diodes 40 might occur, due to the already described transient sensitivity of these devices. This difficulty is obviated in accordance with one aspect of this invention by the limitation of the voltage change at any unswitched diode to a value below the maximum voltage change that can be tolerated by the diodes leading to any busy path. The establishment of the path between subsets 66*b* and 66*d* therefore proceeds in the manner described for the establishment of the upper path except that, with the upper path busy, no interconnecting diodes 40 are switched.

The particular values of voltages shown in FIG. 3 were selected to provide a proper operation of one specific embodiment of my invention without intending to limit the scope thereof to the use of the specific values set forth.

It is to be understood that the above-described arrangements are illustrative of the principles of the invention. Numerous other arrangements may be devised by those skilled in the art without departing from the spirit and scope of the invention.

What is claimed is:

1. A telephone switching network comprising opposed groups of terminals on said network, crosspoint devices of a type exhibiting a sensitivity to sudden voltage changes, said crosspoint devices connected in successive stages for providing conductive paths between selected pairs of said opposed terminals through said switching network, circuit means for biasing said crosspoint devices sufficient to eliminate said sensitivity to sudden voltage changes comprising a rectifier series-connected between each successive stage of said crosspoint devices, a source of potential substantially equal to the breakdown potential of said devices, impedance means in series with said source to limit the current through said crosspoint devices below the value at which said crosspoint devices break down, said impedance means of successive stages cooperating to reverse bias said rectifiers, and low impedance marking potential sources at the opposed terminals of said network to permit the conduction of current sufficient in value to cause successive crosspoint devices to break down, each of said marking potential sources having a sufficient amplitude to overcome the reverse bias applied across said rectifiers.

2. An electrical circuit for controlling the breakdown of a bistable device exhibiting a sensitivity to sudden voltage changes comprising a two-terminal semiconductor bistable device exhibiting such a sensitivity, biasing means connected to opposite terminals of said device, said biasing means including a potential source of a potential substantially equal to the breakdown potential of said device and a large impedance in series with said source to prevent the breakdown of said device by said source potential, a rectifier coupled to one common connection of said device and said biasing means, additional biasing means connected to the terminal of said rectifier opposite said device to cause said rectifier to be normally back-biased, and means also connected to said opposite terminal for supplying pulses of a polarity and amplitude sufficient to overcome the normal bias on said rectifier, said pulse means having a low impedance to permit the breakdown of said device upon the occurrence of a pulse.

3. A telephone switching network comprising a plurality of terminal pairs having the terminals of each pair situated on opposite ends of said network, a plurality of interconnected breakdown devices, certain ones of said breakdown devices connected in a distinct series circuit between a terminal pair, a plurality of rectifiers individually connected between adjacent ones of said certain breakdown devices in said series circuit, means connected to the common connections of said breakdown devices and said rectifiers for biasing said devices at their breakdown potential, said biasing means including large values of series resistance to limit the current through associated breakdown devices below the breakdown value, said biasing means further maintaining said rectifiers normally reversed-biased, and marking potential sources connected to said terminals to overcome said reverse bias across said rectifiers, said marking sources having a low value of series resistance to cause certain of said devices to break down and provide a conducting path through said network without disturbing established conductive paths through said network.

4. A crosspoint circuit for inclusion in crosspoint network arrangements comprising a semiconductive crosspoint device, a rectifier in series with said crosspoint device, a first impedance connected to said crosspoint device and said rectifier, a second impedance connected to said crosspoint device opposite said first impedance, a bias voltage source of a potential substantially equal to the breakdown potential of said crosspoint device connected in series with said impedances, both of said impedances acting to limit the current to said device from said source below a value sufficient to permit said device to break down, and means for applying a voltage pulse through said rectifier to said crosspoint device, said means including a low impedance voltage source of a potential but slightly greater than the potential of said bias voltage source.

5. A bistable switching circuit comprising a PNPN diode having a normal high impedance state and a low impedance state for voltages in excess of its breakdown voltage, a source of voltage approximately equal to said breakdown voltage, impedance means connecting said diode in one loop to said source, said impedance means being of large value to limit the current from said voltage source below the minimum value required to sustain said diode in its low impedance state, unilateral conduction means connected to said diode, biasing means for normally biasing said unilateral conduction means in the reverse direction, and means for applying a voltage from a single low impedance source to said unilateral conducting means sufficient to overcome said normal reverse bias and turn on said diode during the period of application of said low impedance source voltage by bypassing said impedance means.

6. A telephone switching network comprising a plurality of PNPN diodes interconnected to form transmission paths through said network, a voltage source, biasing means including said voltage source connected to each of said diodes to maintain a voltage across said diode substantially equal to the breakdown voltage thereof, said biasing means further including resistors in series with said voltage source to prevent said diodes from breaking down in response to said biasing voltage, and means for establishing transmission paths through said network by applying voltages from a low impedance source only slightly in excess of the voltages applied by said biasing means to prevent the breakdown of diodes leading to an already established network path.

7. A telephone switching network comprising a plurality of bistable devices exhibiting a sensitivity to sudden voltage changes arranged in a network configuration, means for biasing said devices sufficient to eliminate said sensitivity to sudden voltage changes including a voltage source substantially equal to the breakdown voltage of said bistable devices and further including current limiting means between said source and said devices, and means for establishing transmission paths through said network by applying selecting signals to said network from a low impedance source of voltage only slightly in excess of said breakdown voltage to bypass certain of said current limiting means and break down selected ones of said bistable devices.

8. A telephone switching network configuration comprising a plurality of interconnected PNPN diodes having terminal zones of opposite conductivity type, biasing means connected to said diodes through high impedance branches to establish a resistive load line inadequate to break down said diodes, a rectifier interposed between terminal zones of opposite conductivity type of each pair of adjacent series-connected PNPN diodes, means for maintaining said rectifiers normally reverse-biased, signaling means comprising a low impedance signaling source of voltage slightly in excess of said breakdown voltage, and means for selectively applying pulses from said signaling means to certain of said diodes to overcome the normal reverse bias of said rectifiers, bypass certain of said high impedance branches and shift the resistive load lines for associated PNPN diodes to break down said diodes.

9. A switching circuit for a bistable device sensitive to sharp changes of voltage comprising such a bistable device, biasing means for maintaining a voltage across said device substantially equal to its breakdown voltage, said biasing means including a voltage source and impedances providing a resistive load line for said device inadequate to permit the switching of said device, and means for applying a pulse only slightly in excess of said breakdown voltage to one side of said device through a low impedance path which effectively shifts said load line to permit said device to switch on during the length of said pulse.

10. An electrical circuit comprising a first semiconductive bistable crosspoint device, a rectifier, and a second semiconductive bistable crosspoint device connected in series, means including a voltage source and a load resistor for biasing said second semiconductive crosspoint device substantially at its breakdown potential, said load resistor defining a load line for said second crosspoint device to prevent said second crosspoint device breaking down in response to being biased substantially at its breakdown potential, means for normally reverse biasing said rectifier, and means for effecting breakdown of said first semiconductive crosspoint device to forward bias said rectifier and bypass said load resistor thereby breaking down said second semiconductive crosspoint device.

References Cited in the file of this patent

UNITED STATES PATENTS

| | | |
|---|---|---|
| 2,779,822 | Ketchledge | Jan. 29, 1957 |
| 2,843,674 | Ketchledge | July 15, 1958 |
| 2,855,524 | Shockley | Oct. 7, 1958 |
| 2,859,283 | Dunlap | Nov. 4, 1958 |
| 2,866,858 | Sziklai | Dec. 30, 1958 |
| 2,931,863 | Faulkner | Apr. 5, 1960 |
| 2,956,855 | Hussey | July 26, 1960 |